(12) United States Patent
Engels et al.

(10) Patent No.: US 10,014,676 B2
(45) Date of Patent: Jul. 3, 2018

(54) HIGH-VOLTAGE BUSHING

(71) Applicant: SIEMENS AKTIENGESELLSCHAFT, Munich (DE)

(72) Inventors: Engelbert Engels, Cologne (DE); Achim Langens, Lohmar (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/307,188

(22) PCT Filed: May 12, 2014

(86) PCT No.: PCT/EP2014/059627
§ 371 (c)(1),
(2) Date: Oct. 27, 2016

(87) PCT Pub. No.: WO2015/172806
PCT Pub. Date: Nov. 19, 2015

(65) Prior Publication Data
US 2017/0047721 A1    Feb. 16, 2017

(51) Int. Cl.
*H02G 3/22* (2006.01)
*H01B 17/28* (2006.01)

(52) U.S. Cl.
CPC ............ *H02G 3/22* (2013.01); *H01B 17/28* (2013.01)

(58) Field of Classification Search
CPC .................. H02G 3/22; H01B 17/28
See application file for complete search history.

(56) References Cited

U.S. PATENT DOCUMENTS

| | | | | | |
|---|---|---|---|---|---|
| 2,125,089 | A | * | 7/1938 | Skvortzoff | H01B 17/28 174/12 BH |
| 2,945,912 | A | * | 7/1960 | Imhof | H01B 17/28 174/143 |
| 3,522,364 | A | * | 7/1970 | Kagaya | H01B 17/28 174/143 |
| 2012/0292073 | A1 | | 11/2012 | Engels et al. | |

FOREIGN PATENT DOCUMENTS

| | | | | |
|---|---|---|---|---|
| CN | 102714077 A | | 10/2012 | |
| CN | 203325604 U | | 12/2013 | |
| DE | 2911402 A1 | * | 10/1980 | ............ H01B 17/28 |
| GB | 345604 A | | 3/1931 | |
| JP | H05274939 A | | 10/1993 | |
| SU | 1325580 A1 | | 7/1987 | |

* cited by examiner

*Primary Examiner* — William H Mayo, III
*Assistant Examiner* — Hiram E Gonzalez
(74) *Attorney, Agent, or Firm* — Laurence Greenberg; Werner Stemer; Ralph Locher

(57) ABSTRACT

A high-voltage bushing contains an insulating body that is arranged concentrically around a cylindrical winding support formed of an electrically-conductive material, conductive control inlays which capacitive potential control the high-voltage bushing and are spaced apart from one another by insulation layers, and are arranged concentrically with the winding support. A connection device is provided for establishing an electrical connection between a first control inlay closest to the winding support, and the winding support. The high-voltage bushing is characterized in that the connection device contains an electrical sliding contact.

10 Claims, 1 Drawing Sheet

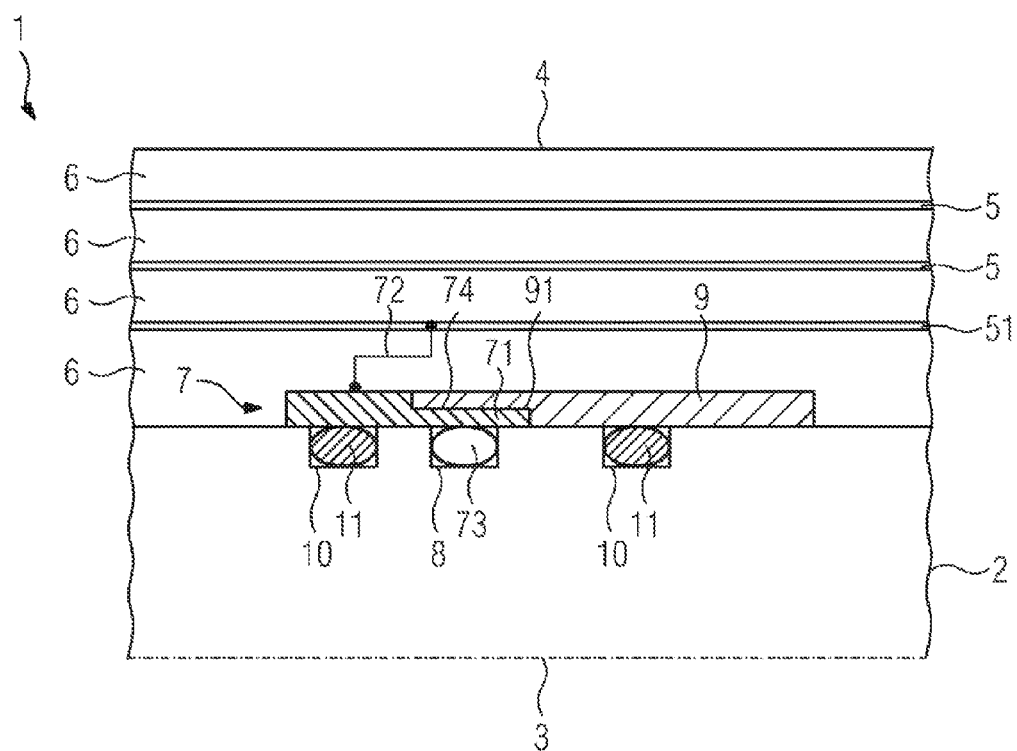

HIGH-VOLTAGE BUSHING

BACKGROUND OF THE INVENTION

Field of the Invention

The invention relates to a high-voltage bushing with an insulating body arranged concentrically around a cylindrical winding support of an electrically conductive material, conductive control inserts for the capacitive control of the high-voltage bushing, which are mutually spaced by means of insulation layers and arranged concentrically to the winding support, and a connection device for the formation of an electrical connection between a first control insert closest to the winding support, and the winding support.

High-voltage bushings of this type are known from the prior art. Their general function is the insulation of a high-voltage line at a high-voltage potential, and incorporating a current-carrying conductor, from a partition which is essentially at ground potential and through which the high-voltage line is to be routed.

However, conductors or winding supports in known high-voltage bushings are not generally perfectly cylindrically symmetrical, and feature production-related irregularities in their surface. For this reason, field distribution in the vicinity of the conductor/winding support is non-uniform, thereby resulting in an impairment of the voltage withstand of the high-voltage bushing.

This results in an electro-technical necessity for the electrical connection of the winding support to the first control insert, by means of a connection device. This is also described as bonding.

In known high-voltage bushings from the prior art, the connection device is configured as a flexible metal strip. The metal strip is secured at one end to the winding support, and at the other end to the first control insert. Moreover, the metal strip is permanently enclosed in the insulating medium of the insulating body. As a result of the different thermal expansion of the insulating medium or insulating body and the winding core or other components of the high-voltage bushing, or as a result of the relative movement thereof, for example by the action of mechanical forces, the metal strip is subject to tensile or compressive forces. In the known high-voltage bushings, the load capability of bonding in response to the action of these forces is dictated by the ductility of the metal strip. This means that relative movements can only be compensated up to the yield point of the metal used. Any over-extension of the metal strip will ultimately result in the failure thereof, and the consequent interruption of bonding. In consequence, the entire high-voltage bushing is compromised and, under certain circumstances, may no longer be fit for use.

BRIEF SUMMARY OF THE INVENTION

The object of the present invention is the elimination of the above-mentioned disadvantage, and the disclosure of a high-voltage bushing, the bonding of which delivers optimum reliability in response to relative movements between the insulating body and the winding support.

This object is fulfilled according to the invention by a high-voltage bushing of the type described above, wherein the connection device between the winding support and the first control insert incorporates a sliding contact.

The sliding contact enhances the reliability of bonding, in that the flexibility of the connection device is not limited by the maximum extensibility of the constituent material of the connection device.

The sliding electrical contact preferably comprises a first contact piece which is electrically connected to the first control insert, and a second contact piece which is electrically connected to the winding support. For example, the first contact piece can be solidly bonded to the insulating body, such that it undergoes no movement relative to the insulating body. The second contact piece can be arranged axially on the winding support at the level of the first contact piece, opposite the latter. The first contact piece thus bonds with the second contact piece. Appropriately, the second contact piece is arranged such that, in the event of movement of the winding support relative to the insulating body, it moves with the winding support. By this arrangement it can be achieved that, in case of the relative movement of the winding support and the insulating body, electrical contact between the first and the second contact piece is maintained by the sliding contact. To this end, the first and the second contact piece are appropriately configured of a conductive material.

According to one form of embodiment of the invention, the first contact piece is a metal ring, which is arranged circumferentially between the winding support and the insulating body. The inner surface of the metal ring, which faces the winding support, preferably forms a contact surface of the sliding contact. The metal ring is appropriately connected to the first control insert by means of a metal strip. During the manufacture of the high-voltage bushing, for example, the metal strip can be inserted in a blank winding, which is then impregnated with a solidifying insulating medium, thereby forming the insulating body. Accordingly, the metal strip is secured in the insulating body, such that an electrical connection between the first control insert and the metal ring is maintained. During a relative movement of the insulating body and the winding support, the metal strip remains fixed in the insulating body. Essentially, no tensile forces are applied to the metal strip.

On the grounds of its electrical and mechanical properties, brass is a preferred material for the metal ring.

Preferably, the first contact piece is secured to the insulating body by means of a retaining ring. The retaining ring permits an improved attachment of the first contact piece to the insulating body. The retaining ring and the binding properties thereof should be appropriately adapted to the constituent materials of the first contact piece and the insulating body.

The retaining ring preferably contains resin. Specifically, this improves the bonding of the retaining ring to the insulating medium of the insulating body, where the latter also contains resin. The retaining ring can comprise, for example, a resin and paper mixture.

According to a further form of embodiment of the invention, the second contact piece is a contact spring arrangement, which is arranged in a circumferential groove in the winding support. The arrangement of the contact spring arrangement in the circumferential groove ensures that the contact spring arrangement is essentially translation-invariant in relation to the winding support. The contact spring arrangement is appropriately configured, such that it generates a force in the direction of the first contact piece. This is advantageous, in that an exceptionally stable electrical connection is formed between the first and the second contact piece.

The contact spring arrangement is preferably designed as a helical spring. The diameter of the helical spring windings is dimensioned such that the windings of the helical spring arranged in the groove are compressed against the first contact piece. This can be achieved, for example, wherein the diameter of the windings slightly exceeds the depth of the groove.

According to one form of embodiment of the invention, the winding support is configured as a conductor. This simplifies the manufacture of the high-voltage bushing. However, it is also conceivable that the conductor is routed as a separate component through an interior of the cylindrical winding support, whereby the conductor, in this case, is conductively connected by bonding to the winding support, and wherein the conductive connection is arranged at a single axial point, in order to prevent the formation of any parallel current path through the winding support. A clearance between the conductor and the winding support can be filled, for example, with an insulating material. Preferably, the insulating body is resin-impregnated. The insulating layers of the insulating body can comprise, for example, paper, such as crepe paper, or fleece, whereby, during the manufacturing process of the high-voltage bushing, the insulating layers, together with the conductive control inserts, are wound onto the winding support. The insulating body with the wound-on insulating layers and control inserts is then impregnated with a resin or a resin mixture, such that the curing of the resin mass forms a compact block which contains no voids in the interior of the insulating body.

Preferably, the high-voltage bushing is provided with a mounting flange for the fitting of the high-voltage bushing, which is secured to the exterior of the insulating body. By means of the mounting flange, the complete high-voltage bushing can be fitted to the boundary wall of a through opening, through which the high-voltage line is to be routed.

The invention is described hereinafter with reference to the exemplary embodiment represented in the FIGURE.

BRIEF DESCRIPTION OF THE DRAWING

The FIGURE shows a schematic representation of a section of one form of embodiment of the high-voltage bushing according to the invention.

DESCRIPTION OF THE INVENTION

A section of a high-voltage bushing 1 is represented in cross section in the FIGURE. The section of the high-voltage bushing 1 shown in the FIGURE has a winding support 2, which is configured cylindrically. The axis of symmetry of the cylindrical winding support 2 is marked by a dashed line 3. In the exemplary embodiment of the high-voltage bushing 1 shown, the winding support 2 is simultaneously the conductor. An insulating body 4 is arranged coaxially around the winding support 2.

The insulating body 4 comprises control inserts 5, 51 for the capacitive control of the high-voltage bushing, wherein the control inserts 5, 51 are arranged coaxially to the winding support 2. Insulating layers 6 are arranged between the individual control inserts 5, 51. The insulating layers contain an insulating medium. In the present exemplary embodiment, the insulating medium comprises resin-impregnated crepe paper.

It should be noted that not all insulating layers and not all control inserts are graphically represented in the FIGURE. The size of the high-voltage bushing 1 and the number and mutual spacing of the control inserts are dictated by requirements for the insulating properties of the high-voltage bushing.

For the bonding of the winding support 2 to the first control insert 51, the high-voltage bushing 1 has a connection device 7. The connection device 7 comprises a first contact piece 71, configured as a brass ring. The brass ring 71 is electrically connected to the first control insert 51 by means of a metal strip 72. The brass ring 71 is arranged coaxially around the winding support 2. The brass ring 71 has an axial length which, by secure bonding in the event of temperature-related longitudinal expansion or mechanically-related relative movements of the insulating body 4 and the winding support 2, ensures an electrical connection between the winding support 2 and the insulating body 4. The connection device 7 also comprises a second contact piece 73, configured in the form of a helical spring. The helical spring is arranged in a circumferential groove 8 in the winding support 2. The diameter of the windings of the helical spring 73 is dimensioned such that the helical spring is compressed against the first contact piece 71. This means that the diameter of the windings of the helical spring 73 slightly exceeds the depth of the groove 8.

The brass ring 71 is secured to the insulating body by means of a retaining ring 9. The retaining ring 9 is comprised of a resin-paper mixture which bonds effectively with the insulating medium of the insulating layers 6 and with the material of the first contact piece 71.

The brass ring 71 has a step 74 which, for the improved retention of the brass ring 71 on the insulating body 4, cooperates with a corresponding step 91 on the retaining ring 9.

The winding support 2 is also provided with two further grooves 10, which are arranged circumferentially. One of the grooves 10 is arranged axially to the front, and the other groove 10 axially to the rear of the groove 8. Sealing rings 11 are arranged in each of the grooves 10. The sealing rings 11 ensure that, during the manufacturing process of the high-voltage bushing 1, the groove 8 is kept free of insulating material, for example a liquid and curable resin. By this arrangement, it can be achieved that the helical spring 73 is deformable within the groove 8, such that it can exert a force in the direction of the brass ring.

The brass ring 71 and the metal strip 72 respectively are secured on or in the insulating body 4, such that relative movement between the brass ring 71 and the insulating body 4 is not possible. If, as a result of relative movement between the winding body 2 and the insulating body 4, the brass ring is displaced relatively to the helical spring 73, the windings of the helical spring 73 slide on the inner contact surface of the brass ring 71. By this arrangement, a sliding contact between the brass ring 71 and the helical spring 73 is maintained. Accordingly, an electrical connection between the winding support 2 and the first control insert 51 can be maintained at all times. As the metal strip 72 is securely enclosed by the insulating medium of the insulating layer 7, any relative movement of the winding body in relation to the insulating body 4 cannot result in the failure of the metal strip 72.

SCHEDULE OF REFERENCE NUMBERS

1 High-voltage bushing
2 Winding support
3 Line
4 Insulating body
5, 51 Control inserts 6 Insulating layer
7 Connection device
71 First contact piece
72 Metal strip
73 Second contact piece
74 Step
8 Groove
9 Retaining ring
91 Step
10 Groove
11 Sealing ring

The invention claimed is:

1. A high-voltage bushing, comprising:
a cylindrical winding support formed of an electrically conductive material;
an insulating body disposed concentrically around said cylindrical winding support; insulation layers;
conductive control inserts for capacitive potential control of the high-voltage bushing, said conductive control inserts being mutually spaced by means of said insulation layers and said conductive control inserts disposed concentrically to said cylindrical winding support, said conductive control inserts include a first control insert and a second control insert; and
a connection device for formation of an electrical connection between said first control insert being closest to said cylindrical winding support, and said cylindrical winding support, said connection device having a sliding electrical contact, said sliding electrical contact having a first contact piece electrically connected to said first control insert, said first contact piece having a first step; and
a retaining ring securing said first contact piece to said insulating body, said retaining ring having a retaining ring step cooperating with said first step for retention of said first contact piece on said insulating body.

2. The high-voltage bushing according to claim 1, wherein said sliding electrical contact has a second contact piece which is electrically connected to said cylindrical winding support and disposed for moving together with said cylindrical winding support.

3. The high-voltage bushing according to claim 2, wherein:
said cylindrical winding support has a circumferential groove formed therein; and
said second contact piece is a contact spring configuration, which is disposed in said circumferential groove in said cylindrical winding support.

4. The high-voltage bushing according to claim 3, wherein said contact spring configuration is a helical spring.

5. The high-voltage bushing according to claim 1, wherein said first contact piece is a metal ring which is disposed circumferentially between said cylindrical winding support and said insulating body.

6. The high-voltage bushing according to claim 5, wherein said metal ring is a brass ring.

7. The high-voltage bushing according to claim 1, wherein said retaining ring contains a resin.

8. The high-voltage bushing according to claim 1, wherein said cylindrical winding support is a conductor.

9. The high-voltage bushing according to claim 1, wherein said insulating body is impregnated with a resin.

10. The high-voltage bushing according to claim 1, further comprising a mounting flange for fitting of the high-voltage bushing and is secured to an exterior of said insulating body.

* * * * *